United States Patent [19]

Stevenson

[11] Patent Number: 5,230,484
[45] Date of Patent: Jul. 27, 1993

[54] FISHING REEL

[76] Inventor: David L. Stevenson, P.O. Box 2414, Welkom, 9460, South Africa

[21] Appl. No.: 749,666

[22] Filed: Aug. 26, 1991

[30] Foreign Application Priority Data

Aug. 24, 1990 [ZA] South Africa .............. 90/6758

[51] Int. Cl.⁵ ......................................... A01K 89/015
[52] U.S. Cl. ................................... 242/227; 242/269; 242/318; 242/322
[58] Field of Search ............. 242/227, 228, 229, 268, 242/269, 270, 298, 299, 306, 317, 318, 322

[56] References Cited

U.S. PATENT DOCUMENTS

| | | | |
|---|---|---|---|
| 2,569,770 | 10/1951 | McFate | 242/228 |
| 2,589,776 | 3/1952 | Colgrove | 242/229 |
| 2,612,325 | 9/1952 | Johnson | 242/229 |
| 2,613,046 | 10/1952 | Redding | 242/229 |
| 2,633,307 | 3/1953 | Morgan et al. | 242/268 |
| 2,659,545 | 11/1953 | Hoke et al. | 242/227 |
| 2,692,093 | 10/1954 | Tengesdal | 242/227 |
| 2,828,088 | 3/1958 | Denison et al. | 242/268 |
| 3,226,052 | 12/1965 | King | 242/228 |
| 3,685,762 | 8/1972 | Winfree et al. | 242/228 |
| 4,213,597 | 7/1980 | Fox | 242/229 |

Primary Examiner—Katherine Matecki
Attorney, Agent, or Firm—Cushman, Darby & Cushman

[57] ABSTRACT

A fishing reel 10 includes a casing 12 having a mounting plate 14 for mounting on a fishing rod. A first elongate member 16 extends from the casing 12 in a direction substantially normal to a longitudinal axis of the fishing rod, the first elongate member 16 being rotatably mounted about a shaft which, int urn, is rotatably mounted in the casing 12. A second elongate member projects from the casing 12 in a direction substantially parallel to the longitudinal axis of the fishing rod. A spool 20 is releasably mounted on either the first elongate member 16 or the second elongate member. A control means 22 is mounted within the casing 12 for controlling operation of the first elongate member 16. The control means 22 includes a drag mechanism 50, a brake mechanism 62 and a noise-making mechanism.

13 Claims, 4 Drawing Sheets

FISHING REEL

FIELD OF THE INVENTION

THIS INVENTION relates to a fishing reel. More particularly, the invention relates to a "side caster"-type fishing reel.

SUMMARY OF THE INVENTION

According to the invention, there is provided a fishing reel which includes a casing having a mounting means for mounting on a fishing rod;

a first elongate member extending from the casing in a direction substantially normal to a longitudinal axis of the fishing rod, the first elongate member being rotatably mounted about a shaft which, in turn, is rotatably mounted in the casing;

a spool which is mounted on the first elongate member to be rotatable therewith; and a control means mounted within the casing for controlling operation of the first elongate member.

The reel may include a second elongate member extending from the casing in a direction substantially normal to the first elongate member, the spool being releasably mounted on the first elongate member to be removable therefrom to be placed on the second elongate member for casting purposes The second elongate member may extend towards the mounting means to aid in casting a line from the spool.

The spool may include an engaging means for releasably engaging a complementary formation on each of the first and second elongate members to that the spool is constrained against rotation relative to the elongate member on which it is mounted.

The reel may include a manipulating means for manipulating the spool, the manipulating means being mounted on the shaft on a side of the casing opposite the side of the casing from which the first elongate member projects. The manipulating means may comprise a handle which rotatably drives the first elongate member via the control means.

The control means may include a gear assembly arranged within the casing, the gear assembly improving a take up ability of the spool.

The gear assembly may include a primary gear mounted about the shaft, the primary gear rotatably driving the first elongate member via an intermediate gear rotatably arranged in the casing and a final gear which is fast with the first elongate member. It will be appreciated that the primary gear is rotatably arranged relative to the shaft.

The control means may include a drag mechanism which acts on the primary gear of the gear assembly for setting the degree of slippage between the first elongate member and the handle.

The drag mechanism may include at least one thrust plate fixedly mounted on the shaft, the thrust plate acting on the said primary gear of the gear assembly via a friction member. Preferably, two thrust plates and friction members are provided, one on each side of the gear.

The control means may further include a brake mechanism which acts on the shaft for braking rotation of the shaft and the handle in one direction while allowing rotation of the shaft and the handle in the opposite direction. The brake mechanism may include a brake arm which releasably engages one of the thrust plates of the drag mechanism.

Still further, the control means may include a noise making mechanism which co operates with a gear of the gear assembly for making a noise when the spool rotates in that direction which plays line out to alert a fisherman who has left his fishing rod unattended. The noise making mechanism may include a ratchet arm which releasably engages the said gear of the gear assembly, the ratchet arm disengaging the gear when the spool is rotated to wind the line onto the spool.

The casing may be closed off by a cover plate for inhibiting the ingress of moisture and detritus into an interior of the casing.

The invention is now described by way of example with reference to the accompanying diagrammatic drawings.

DETAILED DESCRIPTION OF THE DRAWINGS

Figure 1:
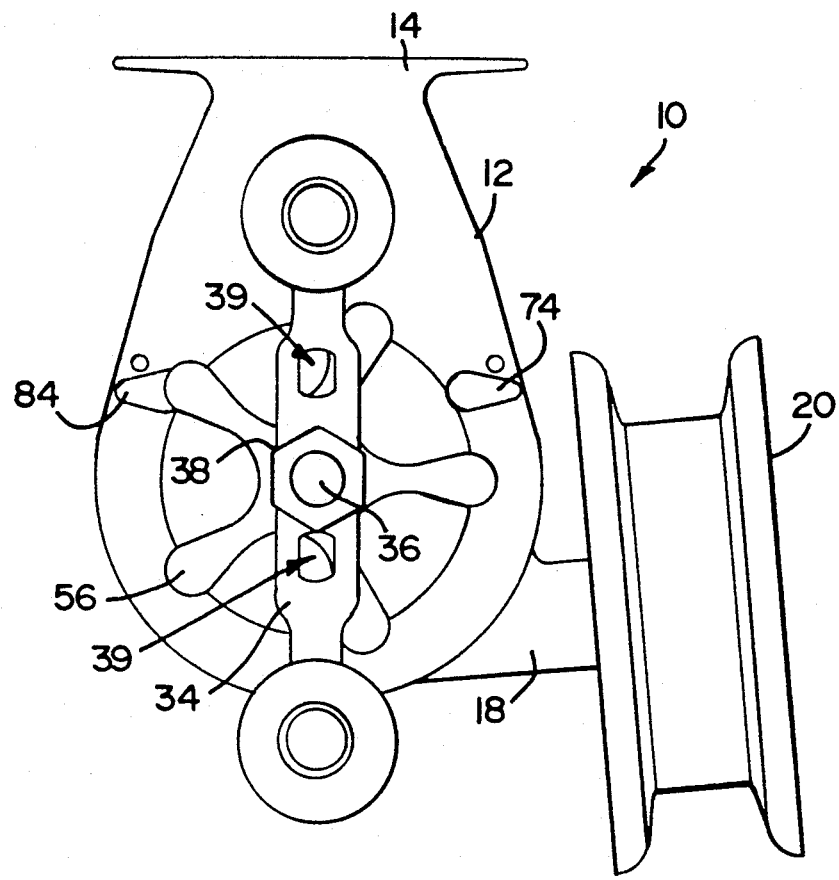
FIG. 1 shows a side view, from a first side, of a fishing reel, in accordance with the invention, with a spool thereof in its casting position.
Figure 2:
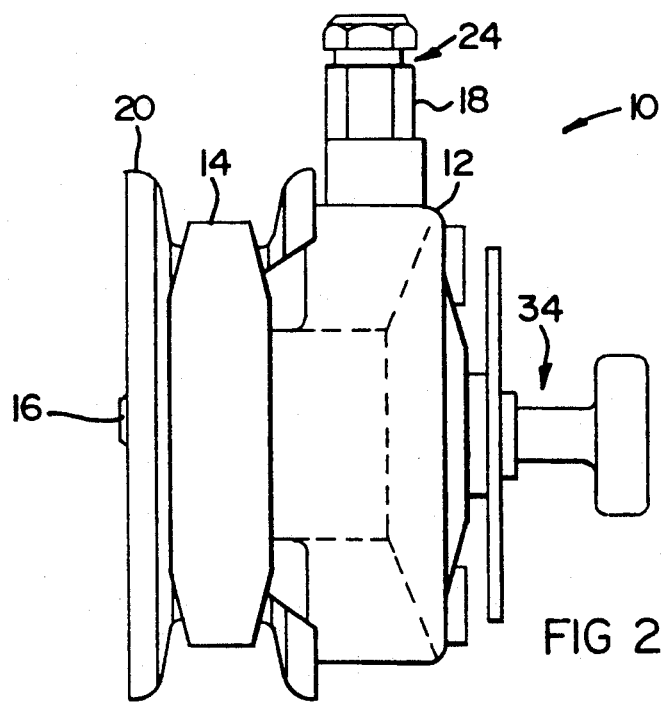
FIG. 2 shows a plan view of the fishing reel.
Figure 3:
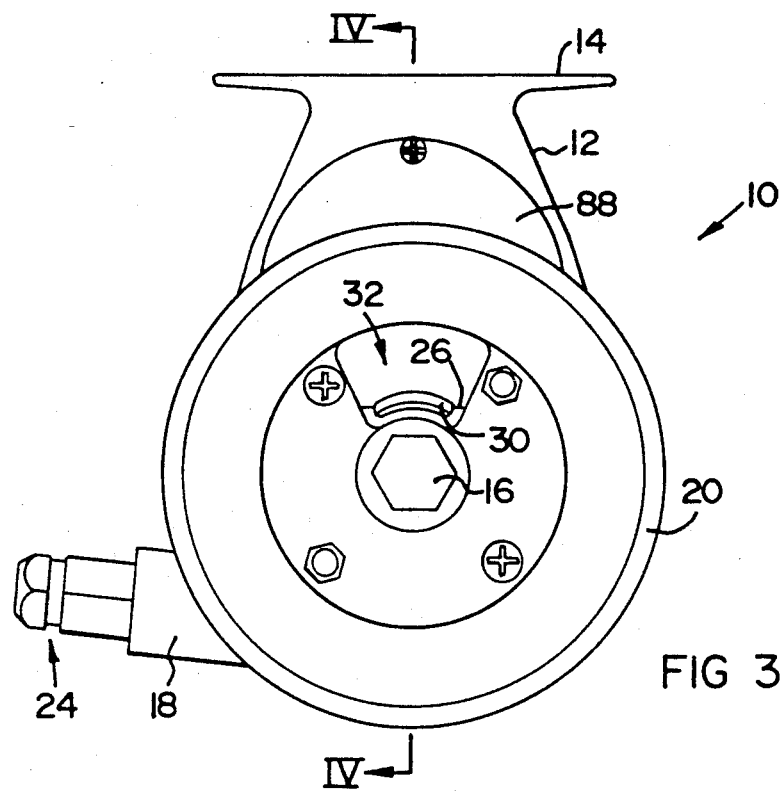
FIG. 3 shows a side view, from an opposed, second side, of the fishing reel, with the spool thereof in its take up position.

Referring to the drawings, a fishing reel, in accordance with the invention, is illustrated and is designated generally by the reference numeral 10. The fishing reel 10 is a side caster-type fishing reel and includes a casing 12 having a mounting means 14 for mounting on a fishing rod (not shown). The mounting means 14 is a conventional elongate plate of curved profile having projections receivable in suitable formations on a handle of the fishing rod.

A first elongate member 16 extends from the casing 12 in a direction substantially normal to a longitudinal axis of the fishing rod. A second elongate member 18 projects form the basing 12 in a direction substantially parallel to the longitudinal axis of the fishing rod. The second elongate member formation 18 is angled towards the mounting means 14.

A spool 20 which, in use, carries fishing line (not shown) is releasably mounted either on the first elongate member 16 or on the second elongate member 18, as will be described in greater detail below. It is to be noted that both elongate member 16, 18 have hexagonal transverse cross sectional profiles so that the spool 20 is constrained against rotation relative to either the first elongate member 16 or the second elongate member 18, as the case may be.

Figure 4:
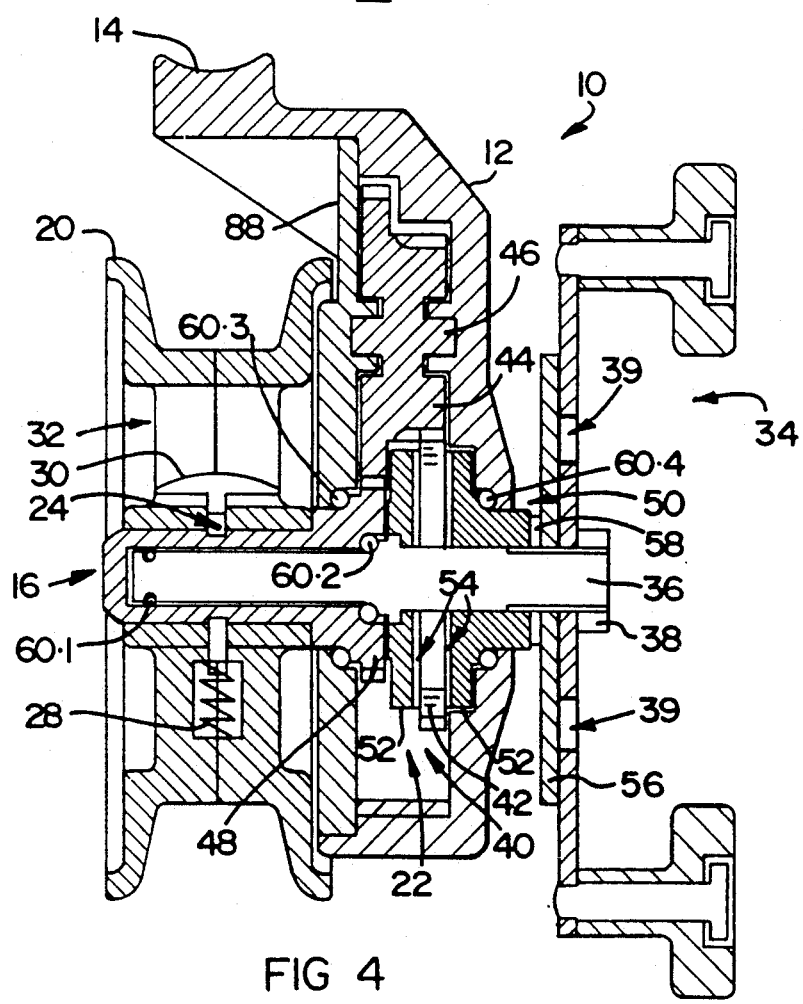
FIG. 4 shows a sectional end view of the fishing reel taken along line IV—IV in FIG. 3.
Figure 5:
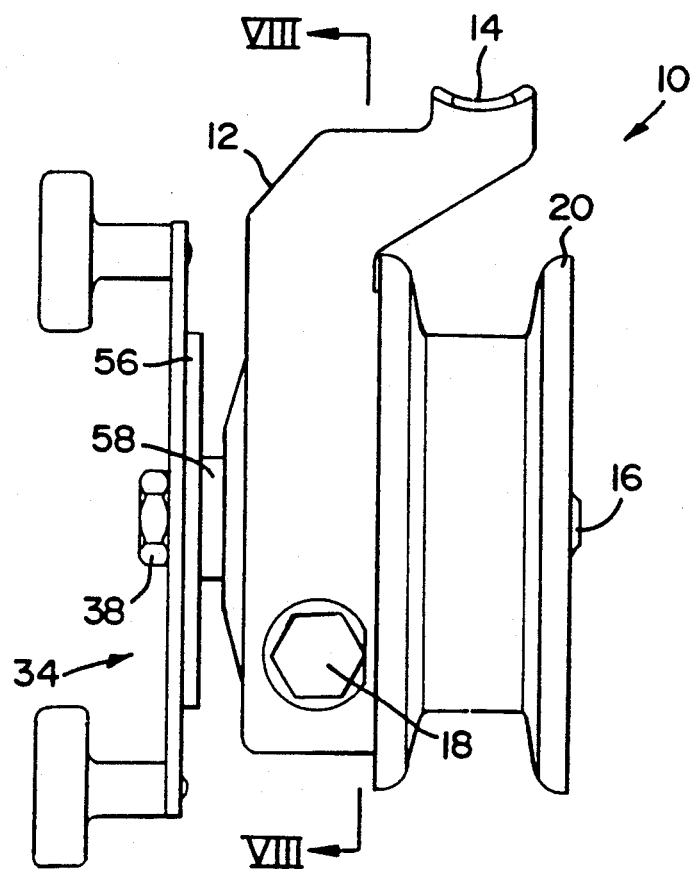
FIG. 5 shows a front view of the fishing reel.

The fishing reel 10 further includes a control means 22 (FIGS. 4 and 8) for controlling operation of the first elongate member 16 and, hence, the spool 20 when the spool 20 is mounted on the first elongate member 16.

Figure 6:
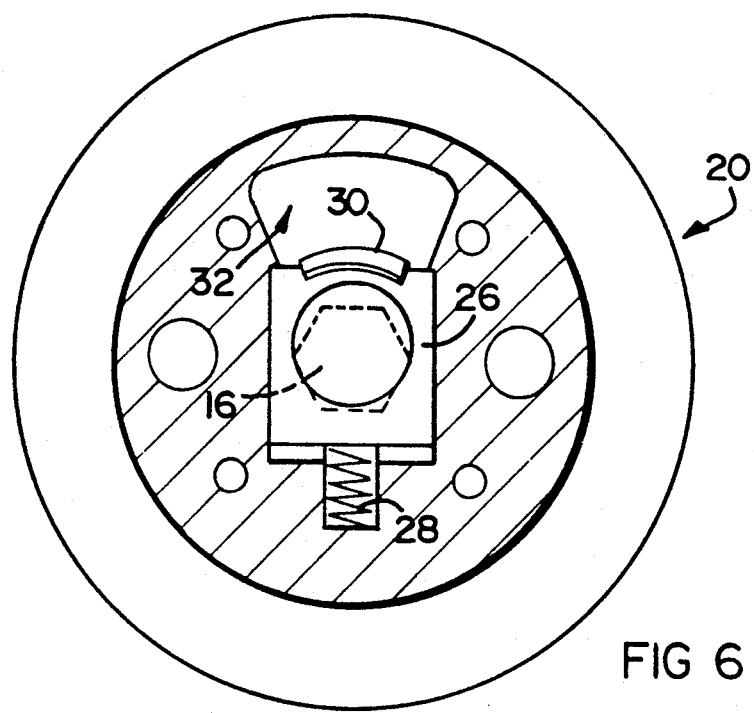
FIG. 6 shows a sectional side view of the spool of the fishing reel.
Figure 7:
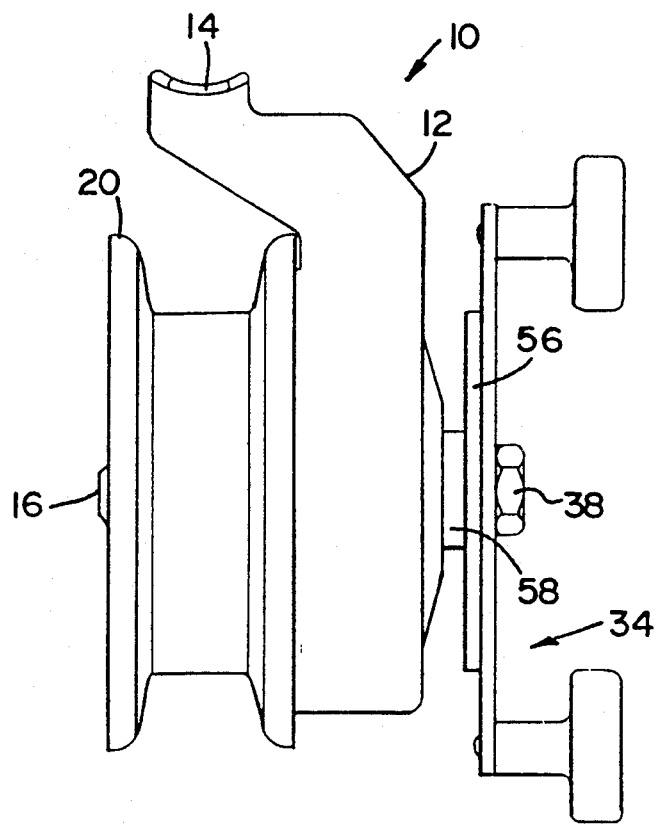
FIG. 7 shows a rear view of the fishing reel.

To effect the releasable mounting of the spool 20 on the elongate member 16 and 18, each elongate member 16, 18 has a circumferentially extending groove 24 defined therein. The spool 20 carries an engaging means in the form of a sliding, apertured plate 26 (FIG. 6) which is urged under the action of an urging means in the form of a coil spring 28 into engagement with the groove 24. For releasing the spool 20 from the elongate member 16, 18 a button like portion 30 is provided on the plate 26 which is depressed to urge the plate 26 out of engagement with the groove 24. To enable access to be gained to the button like portion 30, an opening 32 is defined in the spool 20.

A manipulating means in the form of a handle 34 is mounted on that side of the casing 12 opposite the side from which the elongate member 16 extends. The handle 34 is mounted on a shaft 36 and is retained in position by a retaining nut 38. The handle 34 has additional openings 39 defined therein for varying the position of the handle 34 on the shaft 36.

The control means 22 includes a gear assembly 40 (FIG. 4) by means of which the handle 34 rotates the first elongate member 16.

The gear assembly 40 comprises a primary or main gear 42 mounted on the shaft 36. The gear 42 can rotate relative to the shaft 36, ie. it floats relative to the shaft 36. The main gear 42 drives an intermediate gear 44 which is rotatably received in the casing 12 via a shaft 46. The shaft 46 is formed integrally with the gear 44 as a one piece unit.

The intermediate gear 44, in turn, drives a final gear 48. The final gear 48 is formed integrally with the elongate member 16 and, in this regard, it is to be noted that the elongate member 16 is rotatably mounted on the shaft 36.

It will be appreciated that the gears 42, 44 and 48 are configured to provide an appropriate gear ratio between the handle 34 and the elongate member 16 to reduce the mechanical effort required to wind line onto the spool 20 via the handle 34.

The control means 22 includes a drag mechanism 50 for setting the degree of slippage between the first elongate member 16 (and the spool 20 when mounted thereon) and the shaft 36. The drag mechanism 50 comprises a pair of thrust plates 52 mounted on opposed sides of the gear 42. A friction member in the form of a friction plate 54 is arranged between each thrust plate 52 and the main gear 42 of the gear assembly 40. To set the drag or slippage between the first elongate member 16 and the handle 34 a drag nut 56 is rotatably mounted on the shaft 36 and bears against one of the thrust plates 52 via a washer 58. The drag nut 56 is shown more clearly in FIG. 1 of the drawings.

It will be appreciated that, as the nut 56 is rotated, it causes the thrust plates 52 to urge the friction plates 54 into engagement with the main gear 42 thereby reducing the slippage between the shaft 36 and the first elongate member 16.

It is to be noted that the first elongate member 16 is rotatably mounted about the shaft 36 via bearings 60.1 and 60.2. The first elongate member 16 is also rotatably supported in the casing 12 via a bearing 60.3. Further, the thrust plate 52 against which the washer 58 of the drag mechanism 50 bears is also rotatably supported in the housing via a bearing 60.4. The bearings 60.1 to 60.4 are comprised of floating balls to permit limited axial movement of the various members supported thereby.

Figure 8:
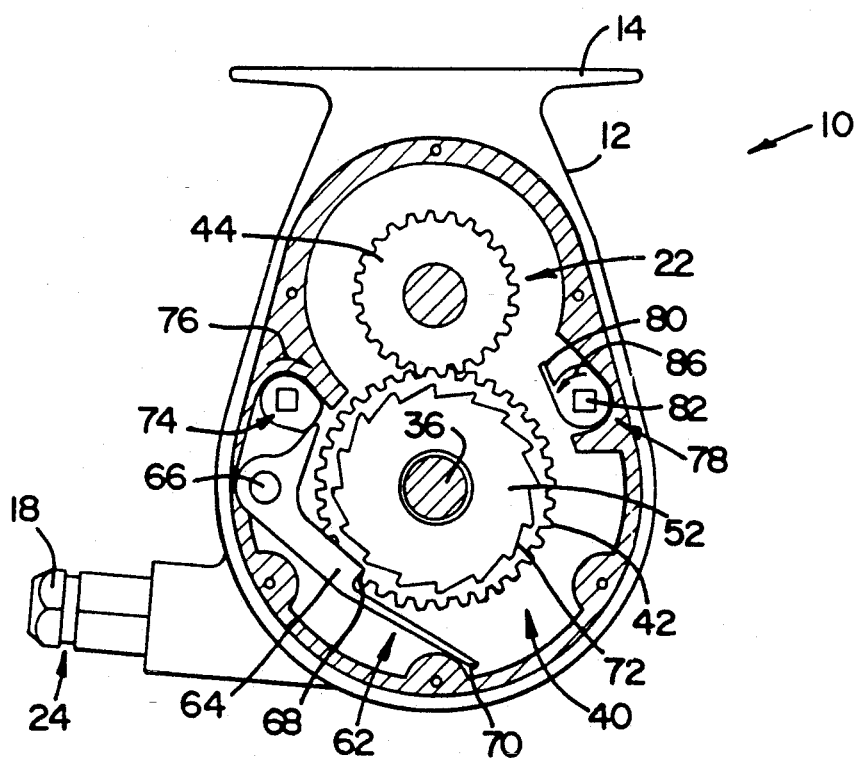
FIG. 8 show a sectional side view of part of the fishing reel taken along line VIII—VIII in FIG. 5.

Referring now to FIG. 8 of the drawings, further features of the control means 22 are discussed in greater detail. The control means 22 thus includes a brake mechanism 62 for braking the handle 34 in one direction whilst allowing rotation of the handle 34 in the opposite direction. The brake mechanism 62 includes a brake arm 64 which is pivotally mounted via a pivot point 66 in the casing 12. The brake arm 64 has an engaging tooth 68 and an urging means 70 which is in the form of extension of the arm 64 for urging the engaging tooth 68 into engagement with a periphery 72 of that thrust plate 52 of the drag mechanism 50 which is closer to the spool 20. It is to be noted that the periphery 72 of the thrust plate 52 has a saw-tooth appearance.

As illustrated in FIG. 8 of the drawings, the brake mechanism 62 is shown deactivated. To activate the brake mechanism 62, an activator 74 is provided which is accessible externally of the casing 12 as shown more clearly in FIG. 1 of the drawings. When in its deactivated position, the activator 74 holds the engaging tooth 68 of the brake arm 64 out of engagement with the periphery 72 of the thrust plate 52. To engage the thrust plate 52, the activator 74 is rotated in the direction of arrow 76. This causes the extension 70 of the brake arm 64 to urge the engaging tooth 68 into engagement with the periphery 72 of the thrust plate 52 thus inhibiting rotation of the thrust plate 52 and, hence, the shaft 36 in one direction whilst allowing free rotation of the shaft 36 (subject to the drag imparted thereto by the drag mechanism 50) in the other direction.

The control means 22 also includes a noisemaking mechanism 78. The noise-making mechanism 78 comprises a ratchet arm 80 pivotally mounted within the casing 12 via a pivot point 82. The ratchet arm 80 is urged into engagement with the gear 42 of the gear assembly 40 when the noise-making mechanism is activated via an activator 84 (FIG. 1) which is accessible externally of the casing 12. The arrangement of the noise making mechanism 78 is such that when the activator 84 rotates the arm 80 in the direction of arrow 86, the arm 80 is urged into engagement with teeth of the gear 42.

In use, the fishing reel 10 is mounted on the fishing rod via the mounting means 14. To cast a line into the water, the spool 20 is removed from the elongate member 16 by releasing the plate 26 from engagement with the groove 24 and the spool 20 is then mounted on the elongate member 18 by being clipped into position on the elongate member 18 as shown in FIG. 1 of the drawings.

Once casting of the line has been completed, the spool 20 is removed from the elongate member 18 and is replaced on the elongate member 16.

When the line has been placed at the desired location by winding onto the spool 20 using the handle 34 and having pre set the drag mechanism 50 to reduce slippage between the shaft 36 and the elongate member 16, the drag is further adjusted using the drag mechanism 50. This is achieved by rotating the drag nut 56 of the drag mechanism 50 such that the thrust plates 52 urge the friction plates 54 into or out of engagement with the gear 42 of the gear assembly 40 as desired.

Once the drag mechanism 50 has been set the brake mechanism 62 may, if desired, also be set via the activator 74. This inhibits rotation of the handle 34 in that direction in which a line is drawn from the spool whilst permitting rotation of the handle 34 in the direction which winds line onto the spool.

If a fisherman is leaving his rod unattended, the noise making mechanism 78 is set using the activator 84. When the activator 84 is rotated in the direction of the arrow 86, the arm 80 is urged into engagement with teeth of the gear 40. Then, should the line be drawn from the spool 20, the arm 80 remains in engagement with the gear thereby causing a noise when the gear 42 rotates and alerts the fisherman. However, if the fisherman wishes to wind line onto the spool 20, the arm 80 is knocked out of engagement with the teeth of the gear 42 such that the line can be wound onto the spool 20 without a noise being made.

It will be appreciated that setting the drag sets the force exerted on a fish should it attempt to run with the line. This can be adjusted in dependence on the braking strain of the line used on the spool 20 and the degree of challenge required by the fisherman. Also, by locking the handle using the brake mechanism 62, the handle 34 is prevented from rotating in one direction whilst rotation of the handle 34 in the other direction is still possible. Thus, should a fish draw the line out when the brake is on, the handle 34 will not rotate but the fisherman will be able to reel the line in using the handle 34. This is especially advantageous in a situation where the line is drawn out suddenly where, if the handle 34 were to rotate, serious injury could be caused to the fisherman.

It is an advantage of the invention that due to the arrangement of the elongate member 16 (ie. by being rotatably mounted on the shaft 36), the control means 22, incorporating the gear assembly 40, the drag mechanism 50 and the brake mechanism 62, can be provided in the fishing reel 10 which has, as far as the applicant is aware, heretofor not been possible. This arrangement also enables the reel 10 to be of a compact construction but it is still sufficiently versatile for most fishing applications from shore fishing to deep sea fishing. It is a further advantage of the invention that the control means 22 is arranged within the casing 12 which is closed off by a cove plate 88 which renders the interior of the casing 12 substantially watertight and which inhibits the ingress of detritus.

I claim:

1. A fishing reel which includes:
   a casing having a mounting mans for mounting a fishing rod;
   a first elongate member extending from the casing in a direction substantially normal to a longitudinal axis of the fishing rod, the first elongate member being rotatably mounted about a shaft which, in turn, is rotatably mounted in the casing;
   a second elongate member extending from the basing in a direction substantially normal to the first elongate member;
   a spool including a releasable fastening means for selectively releasably mounting the spool on the first elongate member for winding up a line, and on the second elongate member for casting a line; and
   a control means arranged within the casing and acting on the shaft for controlling rotation of the first elongate member.

2. The reel as claimed in claim 1 in which a free end of the second elongate member extends away froma handle of the fishing rod to aid in casting a line from the spool.

3. The reel as claimed in claim 1 in which the releasable fastening means of the spool includes an engaging means, the engaging means comprising a plate for releasably engaging a complementary groove on each of the first and second elongate members so that the spool is constrained against rotation relative to that elongate member on which it is mounted.

4. The reel as claimed in claim 1 in which the control means includes a rotating means for rotating the first elongate member, the rotating means being mounted on the shaft on a side of the casing opposite the side of the casing from which the first elongate member projects.

5. The reel as claimed in claim 4 in which the rotating means comprises a handle which rotatably drives the first elongate member via a gear assembly of the control means, the gear assembly being arranged within the casing and the gear assembly improving a take-up ability of the spool when the spool is mounted on the first elongate member.

6. The reel as claimed in claim 5 in which the gear assembly includes a primary gear mounted about the shaft, the primary gear rotatably driving the first elongate member via an intermediate gear rotatably arranged in the casing and a final gear which is fast with the first elongate member, the primary gear meshing with the intermediate gear and the intermediate gear, in turn, meshing with the final gear.

7. The reel as claimed in claim 6 in which the control means includes a drag mechanism which acts on the primary gear of the gear assembly to allow slippage between the first elongate member and the handle.

8. The reel as claimed in claim 7 in which the drag mechanism includes at least one thrust plate fixed mounted on the shaft, the thrust plate acting on said primary gear of the gear assembly via a friction member.

9. The reel as claimed in claim 8 in which the control means includes a brake mechanism which acts on the shaft for braking rotation of the shaft and the handle in one direction while allowing rotation of the shaft and the handle in the opposite direction.

10. The reel as claimed in claim 9 in which the brake mechanism includes a brake arm which releasably engages said thrust plate of the drag mechanism.

11. The reel as claimed in claim 6 in which the control mans includes a noise-making mechanism which cooperates with one of the gears of the gear assembly for making a noise when the spool rotates in that direction which plays line out to alert a fisherman who has left his fishing rod unattended.

12. The reel as claimed in claim 11 in which the noise-making mechanism includes a ratchet arm which releasably engages said gear of the gear assembly, the ratchet arm disengaging the gear when the spool is rotated to wind the line onto the spool.

13. The reel as claimed in claim 1 in which the casing is closed off by a cover plate for inhibiting the ingress of moisture and detritus into an interior of the casing.

* * * * *